(12) United States Patent
Cohen

(10) Patent No.: US 9,661,041 B2
(45) Date of Patent: May 23, 2017

(54) VIRTUAL CONFERENCE MANAGER

(71) Applicant: LinkedIn Corporation, Mountain View, CA (US)

(72) Inventor: Tomer Cohen, Mountain View, CA (US)

(73) Assignee: LinkedIn Corporation, Sunnyvale, CA (US)

(\*) Notice: Subject to any disclaimer, the term of this patent is extended or adjusted under 35 U.S.C. 154(b) by 0 days.

(21) Appl. No.: 13/931,194

(22) Filed: Jun. 28, 2013

(65) Prior Publication Data

US 2015/0007056 A1 Jan. 1, 2015

(51) Int. Cl.
| | | |
|---|---|---|
| G06F 3/048 | (2013.01) | |
| H04L 29/06 | (2006.01) | |
| H04L 29/08 | (2006.01) | |
| H04W 4/02 | (2009.01) | |
| H04W 4/06 | (2009.01) | |

(52) U.S. Cl.
CPC ............ *H04L 65/403* (2013.01); *H04L 67/18* (2013.01); *H04L 67/306* (2013.01); *H04W 4/02* (2013.01); *H04W 4/06* (2013.01)

(58) Field of Classification Search
CPC .. H04L 29/06; H04L 63/102; H04L 2463/101
See application file for complete search history.

(56) References Cited

U.S. PATENT DOCUMENTS

| | | | | |
|---|---|---|---|---|
| 7,113,201 | B1* | 9/2006 | Taylor | H04N 7/15 348/14.08 |
| 7,962,525 | B2* | 6/2011 | Kansal | G06F 17/30038 707/706 |
| 8,683,054 | B1* | 3/2014 | Karakotsios | H04N 5/23222 348/47 |
| 2004/0215497 | A1* | 10/2004 | Leist | G06Q 10/06311 705/7.13 |
| 2007/0067451 | A1* | 3/2007 | Oshiba | H04L 12/2602 709/224 |
| 2009/0086949 | A1* | 4/2009 | Caspi et al. | 379/202.01 |
| 2009/0089055 | A1* | 4/2009 | Caspi et al. | 704/235 |
| 2009/0119246 | A1* | 5/2009 | Kansal | G06F 17/30038 |
| 2010/0205540 | A1* | 8/2010 | Gupta | G06Q 10/107 715/753 |
| 2012/0238248 | A1* | 9/2012 | Jonsson | G06Q 10/1095 455/413 |
| 2012/0284640 | A1* | 11/2012 | Sloyer et al. | 715/753 |
| 2012/0315884 | A1* | 12/2012 | Forutanpour | H04W 4/026 455/414.2 |
| 2013/0018952 | A1* | 1/2013 | McConnell | G06Q 10/1093 709/204 |

(Continued)

*Primary Examiner* — William Bashore
*Assistant Examiner* — Rayeez Chowdhury
(74) *Attorney, Agent, or Firm* — Schwegman Lundberg & Woessner, P.A.

(57) ABSTRACT

A method of using mobile devices of participants of a meeting to facilitate a meeting is disclosed. It is identified that a group of two or more people are conducting the meeting. Information about the group of the two or more people is collected based on a relevance of the information to a context of the meeting. At least a portion of the information is transmitted for presentation in a user interface of a mobile device of each member of the group to facilitate the meeting.

16 Claims, 7 Drawing Sheets

(56) References Cited

U.S. PATENT DOCUMENTS

| | | | |
|---|---|---|---|
| 2013/0091205 A1* | 4/2013 | Kotler | H04L 65/4015 709/204 |
| 2013/0103446 A1* | 4/2013 | Bragdon | G06Q 10/1095 705/7.15 |
| 2013/0222266 A1* | 8/2013 | Gardenfors | G06F 3/1446 345/173 |

* cited by examiner ial field of meeting management and, in one specific example, to using mobile devices of each participant of a meeting to help facilitate the meeting.

VIRTUAL CONFERENCE MANAGER

TECHNICAL FIELD

This application relates generally to the technical field of meeting management and, in one specific example, to using mobile devices of each participant of a meeting to help facilitate the meeting.

BACKGROUND

The efficiency with which meetings are run or organized may affect the bottom line of stakeholders of the participants of the meetings or of the participants themselves. For example, a meeting that starts or ends late or is not well organized may not be beneficial to either the participants or stakeholders. Thus, technology that makes it possible to run or organize meetings more efficiently may have value.

BRIEF DESCRIPTION OF THE DRAWINGS

Some embodiments are illustrated by way of example and not limitation in the figures of the accompanying drawings in which.

DETAILED DESCRIPTION

Figure 1:
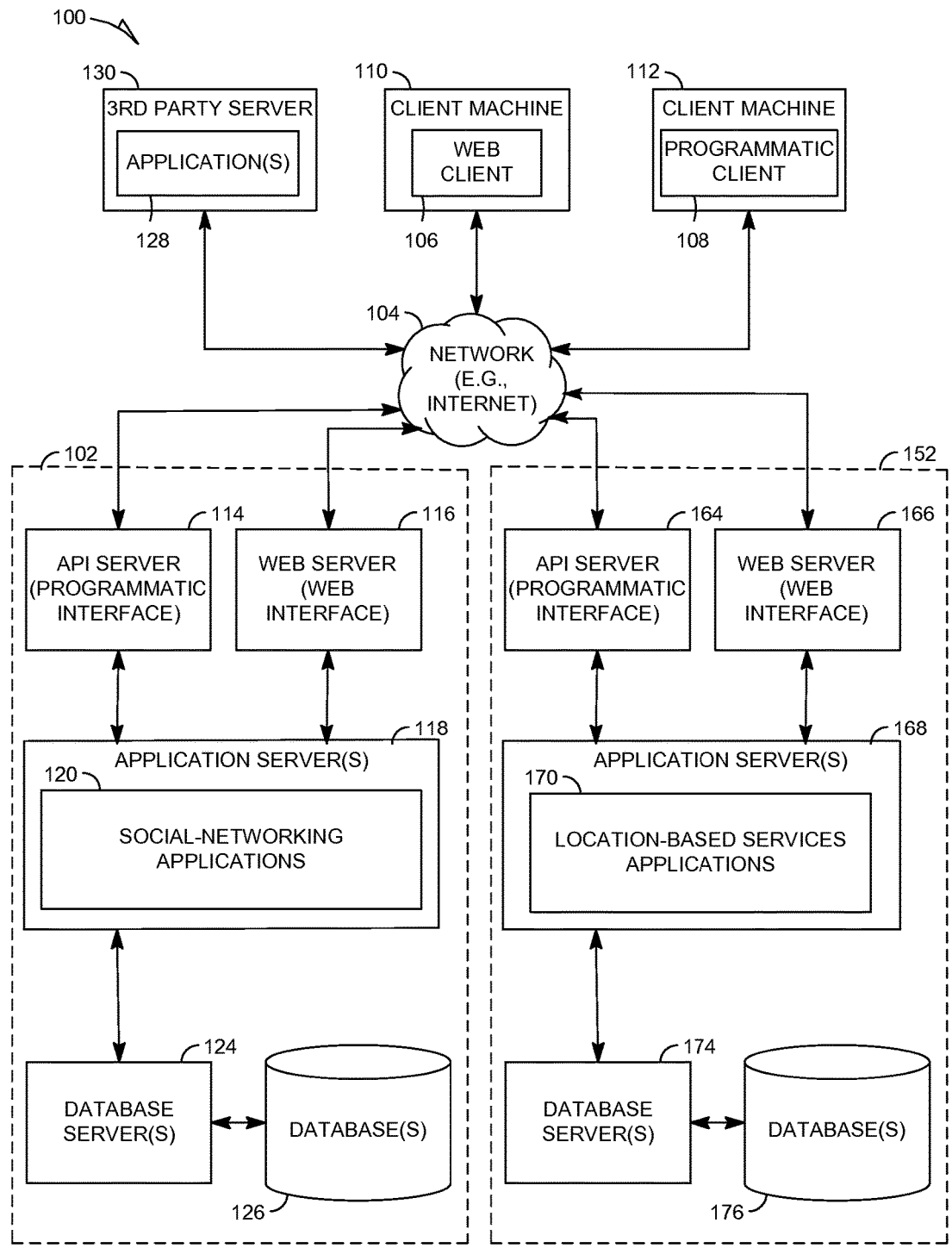
FIG. 1 is a network diagram depicting a client-server system, within which various example embodiments may be deployed.

In the following description, for purposes of explanation, numerous specific details are set forth in order to provide an understanding of various embodiments of the inventive subject matter. It will be evident, however, to those skilled in the art, that embodiments may be practiced without these specific details. Further, to avoid obscuring the inventive concepts in unnecessary detail, well-known instruction instances, protocols, structures, and techniques have not been shown in detail. As used herein, the term "or" may be construed in an inclusive or exclusive sense, the term "user" may be construed to include a person or a machine, and the term "interface" may be construed to include an application program interface (API) or a user interface.

Some mobile devices include software, such as mobile personal assistants, that can assist users with commonly performed tasks. For example, Apple iOS devices have Siri and Google Android devices have Google Now.

Tasks performed by users of mobile devices may include meeting-related tasks, such as scheduling a meeting, starting a meeting, running a meeting, handling formalities associated with a meeting, and so on.

For example, some of the time allocated for a meeting may be taken up by various formalities, such as introductions and exchanges of business cards. These formalities may be automatically handled by applications (e.g., software) executing on mobile devices of the participants, as described herein. For example, virtual business cards of each attendee of a meeting may be automatically communicated to other attendees of the meeting via mobile communications (e.g., wireless or near-field communications), thus eliminating the need for exchanging of physical business cards. Or information about each attendee of a meeting (e.g., names, job titles, role in the meeting, and so on) may be automatically communicated to other attendees, thus eliminating the need for formal introductions. Or information about the physical locations of each attendee of the meeting may be communicated to other attendees of the meeting so that attendees can associate faces with names or other data known about the person without the need for formal introductions. By handling such formalities automatically, software running on mobile devices (e.g., web browsers or native applications) or on a server in communication with the mobile devices may make it possible for the time allocated for a meeting to be used more efficiently by the meeting participants.

Meeting management applications may further assist meeting participants with various meeting tasks, such as starting, conducting, and ending a meeting, as will be described in more detail below. Additionally, the applications may allow users to access information about meetings that have already been conducted, such as action items that were generated during the meeting, who attended the meeting, decisions reached at the meeting, and so on.

In various embodiments, a method of using mobile devices of participants of a meeting to facilitate a meeting is disclosed. It is identified that a group of two or more people are conducting the meeting. Information about the group of the two or more people is collected based on a relevance of the information to a context of the meeting. At least a portion of the information is transmitted for presentation in a user interface of a mobile device of each member of the group to facilitate the meeting.

This method and other methods or embodiments disclosed herein may be implemented by a computer system having one or more modules (e.g., hardware modules or software modules). Such modules may be executed by one or more processors of the computer system. This method and other methods or embodiments disclosed herein may be embodied as instructions stored on a machine-readable medium that, when executed by one or more processors, cause the one or more processors to perform the instructions.

FIG. 1 is a network diagram depicting a client-server system 100, within which various example embodiments may be deployed. A networked system 102, in the example forms of a social-networking system or other communication system, provides server-side functionality via a network 104 (e.g., the Internet or Wide Area Network (WAN)) to one or more clients. FIG. 1 illustrates, for example, a web client 106 (e.g., a browser, such as the Internet Explorer browser developed by Microsoft Corporation of Redmond, Wash.) and a programmatic client 108 executing on respective client machines 110 and 112. Each of the one or more clients 106, 108 may include a software application module (e.g., a plug-in, add-in, or macro) that adds a specific service or feature to a larger system.

Within the networked system 102, an API server 114 and a web server 116 are coupled to, and provide programmatic and web interfaces respectively to, one or more application servers 118. The application servers 118 host one or more social-networking application(s) 120. The application servers 118 are, in turn, shown to be coupled to one or more databases servers 124 that facilitate access to one or more databases (or NoSQL or non-relational data stores) 126.

An additional networked system 152, in the example form of a location-based services system or other system, provides server-side functionality, via a network 104 to the one or more clients.

Within the networked system 152, an API server 164 and a web server 166 are coupled to, and provide programmatic and web interfaces respectively to, one or more application servers 168. The application servers 168 host one or more applications (e.g., location-based services application(s) 170). The application servers 168 are, in turn, shown to be coupled to one or more databases servers 174 that facilitate access to one or more databases (or NoSQL or non-relational data stores) 176. In various embodiments, the location-based services application(s) 170 are configured to receive information on the geographical position of a mobile device. For example, the location-based services applications may receive and transmit data pertaining to the location of a user carrying a mobile. A mobile device may be any device that is capable of being carried around. Examples of mobile devices may include a laptop computer, a tablet computer (e.g., an iPad), a mobile or smart phone (e.g., an iPhone), a smartwatch (e.g., a Pebble E-Paper Watch), an augmented reality head-mounted display (e.g., Google Glass), and so on.

The applications 120 and 170 may provide a number of functions and services to users who access the networked systems 102 and 152. While the applications are shown in FIG. 1 to form part of the networked systems 102 and 152, in alternative embodiments, the applications may form part of a service that is separate and distinct from the networked systems 102 and 152.

Further, while the system 100 shown in FIG. 1 employs a client-server architecture, various embodiments are, of course, not limited to such an architecture, and could equally well find application in a distributed, or peer-to-peer, architecture system, for example. The various applications could also be implemented as standalone software programs, which do not necessarily have computer networking capabilities. Additionally, although FIG. 1 depicts machines 130, 110, and 112 as being coupled to a networked system 102 and networked system 152, it will be readily apparent to one skilled in the art that machines 130, 110, and 112, as well as client 128, 106, and 108, may be coupled to multiple additional networked systems. For example, the clients 128, 106, and 108 may be coupled to multiple applications, such as applications 120 and 170.

The web client 106 accesses the various applications 120 and 170 via the web interface supported by the web server 116 or the web server 166 respectively. Similarly, the programmatic client 108 accesses the various services and functions provided by the applications 120 and 170 via the programmatic interface provided by the API server 114 and API server 164, respectively. The programmatic client 108 may, for example, perform batch-mode communications between the programmatic client 108 and the networked systems 102 and 152.

FIG. 1 also illustrates application(s) 128, executing on a third party server machine 130, as having programmatic access to the networked systems 102 and 152 via the programmatic interface provided by the API server 114 and the API server 164, respectively. For example, the application(s) 128 may, utilizing information retrieved from the networked systems 102 and 152, support one or more features or functions on a website hosted by a third party. The third party website may, for example, provide one or more social-networking functions that are supported by the relevant applications of the networked system 102.

Figure 2:
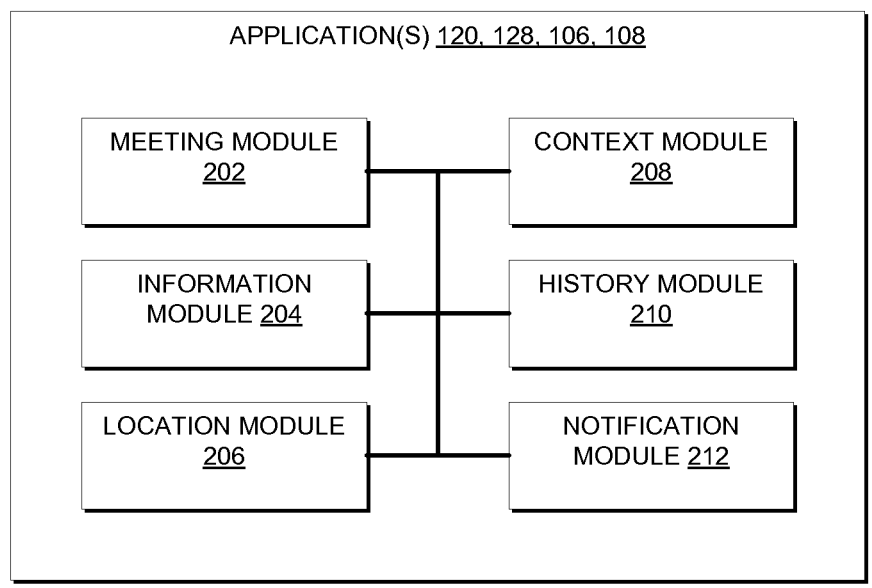
FIG. 2 is a block diagram illustrating example modules that may implement various example embodiments.

FIG. 2 is a block diagram illustrating example modules of the application(s) 106, 108, 120, and 128 of FIG. 1. A meeting module 202 may be configured to facilitate a meeting. For example, the meeting module 202 may identify that enough people are present at a scheduled location and time of a meeting that the meeting is ready to start. Or the meeting module 202 may start the meeting based on an explicit indication from enough or particular ones of the invited participants (e.g., invited participants having a moderator role) that they are ready to start the meeting. The meeting module 202 may automatically handle moderator or chairperson duties, such as notifying participants that the meeting is starting, what the agenda items for the meeting are, who the speakers are, the allotted or remaining time for various portions of the meeting or for the meeting itself, and so on.

An information module 204 may be configured to gather information about the meeting or participants of the meeting. For example, the information module 204 may gather information about a meeting from a meeting scheduling application (e.g., Microsoft Outlook, Google Calendar, and so on). As another example, the information module 204 may gather information about participants of a meeting from a social networking system (e.g., LinkedIn). Such information may include information specified by the participants of the meeting in their profiles and information gathered by the social networking system with respect to the participants (e.g., based on monitoring of their actions with respect to the social networking system).

A location module 206 may be configured to determine respective locations of participants of a meeting. The location module 206 may, for example, collect location information based on communications with the location-based services applications 170.

A context module 208 may be configured to determine a context of a meeting, as described in more detail below.

A history module 210 may be configured to maintain a history of meetings, including content generated by participants of a meeting during the meeting, as described in more detail below. The history module 210 may store the history in storage local to the device or storage external to the device (e.g., in a cloud).

A notification module 212 may be configured to generate notifications of information relevant to the starting, conducting, or finishing of a meeting.

In various embodiments, one or more of the modules 202-212 or portions of the modules 202-212 may be included in server applications 120 or in a client, such as the 3rd party application 128, web client 106, or programmatic client 108 of FIG. 1. In other words, the modules 202-212 may be distributed among the servers and clients such that some or all of the functionality is provided on the server side or some or all of the functionality is provided on the client side. For example, the notification module 212 may be distributed such that a portion of the notification module 212 is implemented on the client side (e.g., for presenting notifications to the user in a user interface of the device) and a portion of the notifications module 212 is implemented on the server side (e.g., for transmitting notifications to the client device from the server).

Figure 3:
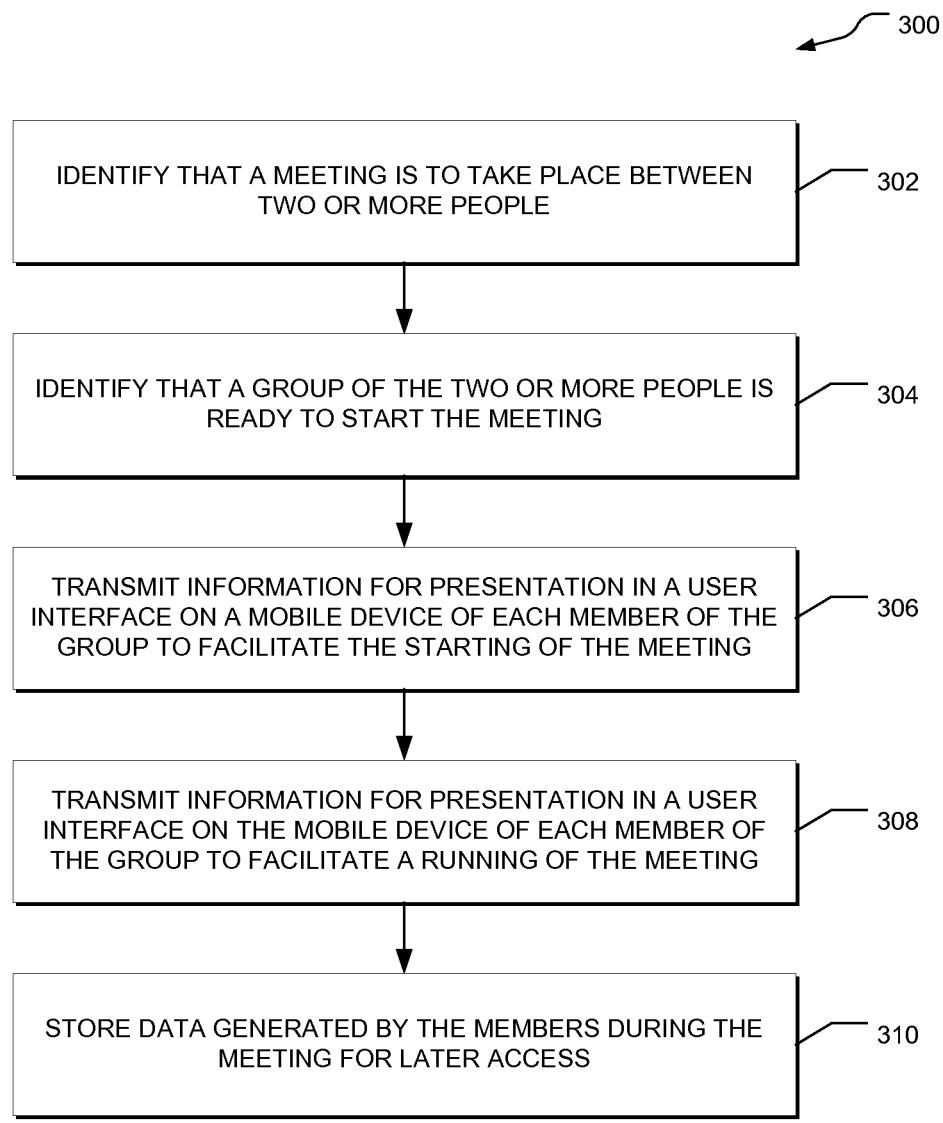
FIG. 3 is a flow chart illustrating example operations of a method 300 of using mobile devices of participants of a meeting to facilitate the meeting.

FIG. 3 is a flow chart illustrating example operations of a method 300 of using mobile devices of participants of a meeting to facilitate the meeting. In various embodiments, the method 300 is implemented by the modules 202-214 of FIG. 2. At operation 302, the meeting module 202, for example, identifies that a meeting is to take place between two or more people. For example, the meeting module 202 identifies that two or more people who are included on a meeting invitation (e.g., a Microsoft Outlook meeting invitation) are at a same physical location (e.g., based on a communication with a location-based services applications 170) at a designated time for the meeting. Or the meeting module 202 identifies that two or more people are present at a same physical location and have been assigned related tasks (e.g., as determined from stored profiles of each of the two or more people, the profiles including tasks assigned to each person and information about relationships between the tasks).

At operation 304, the meeting module 202 identifies that a group of the two or more people is ready to start the meeting. For example, the meeting module 202 determines that the group is seated at a conference table in a conference room associated with the meeting (e.g., via a Microsoft Outlook meeting invitation). In various embodiments, the meeting module 202 may determine that each of the group of the two or more people is ready to start the meeting based on a placement by each of the group of their mobile device, such as mobile phone, in a particular position, such as on a conference table, or in a particular orientation, such as pointing toward the center of the conference table or to a person who has been designated as the meeting organizer or chairperson. The meeting module 202 may determine to start the meeting based on the number of the group exceeding a threshold number, such as 75% of the two or more people who are invited to or are designated as required attendees or optional attendees of the meeting.

At operation 306, the information module 204 may transmit information for presentation in a user interface on a mobile device of each member of the group to facilitate the starting of the meeting. For example, the information module 204 may transmit a representation of a virtual business card of each participant of the meeting for presentation in the user interface. The representation of the virtual business card may include information about each invited participant of the meeting, such as the name of the person, the title of the person, the relationship of the person to other people in a social network (e.g., who the person reports to or works with), where the person is seated at the conference table, or, if attending the meeting remotely, where the person is geographically located), tasks that the person is working on, a meeting or other role assigned to the person, things the person will be discussing at the meeting, a link to the person's professional profile on a social network (e.g., a link to the person's LinkedIn profile), and so on. The information about the participants may be derived from profiles maintained by the participants (e.g., on a social networking site, such as LinkedIn) or from other sources (e.g., Google search results).

For example, a user interface module executing on each mobile device of the meeting participants may receive the transmission of the information and present the information to each user. The presenting of the information by the user interface module may include arranging the representations of the virtual business cards in a user interface on the mobile device such that the relative positions of at least the in-person attendees of the meeting are depicted in the user interface. The amount of available information about each person that is presented within the user interface may be based on various factors such as user preferences, user interface screen real estate, relevance of the information to the meeting, and so on.

At operation 308, the information module 204, for example, may transmit information for presentation in a user interface on the mobile device of each member of the group to facilitate a running of the meeting. For example, the information module 204 may automatically handle moderator or chairperson tasks, such as signaling a starting of the meeting, providing information about agenda items associated with the meeting (e.g., which agenda item is currently being discussed, has already been discussed, or will be discussed next), keeping track of decisions of the group with respect to agenda items, assigning or reassigning tasks to one or more meeting participants, updating a status of one or more tasks or agenda items, showing the allotted time for the meeting or discussion of a specific agenda item, showing how much time is remaining of the allotted time for the meeting or a specific agenda item, showing a list of meeting participants who have weighed in or are expected to weigh in with feedback or comments on a particular agenda item, allotted time for each participant to speak with respect to agenda item, and so on. In various embodiments, the information module 204 may receive input from the users (e.g., via their mobile devices), such as votes on a matter, comments, feedback, or opinions related to an agenda item, new tasks that should be created, who should be assigned to which tasks, information about decisions of the group, and so on.

At operation 310, the history module 210, for example, may store content generated by the participants of the meeting for later access. For example, the history module 210 may store information pertaining to new tasks that were created during the meeting, assignments or reassignments of people to new or old tasks, updates on the status of an agenda item, information about decisions made by the group, or any other content. In various embodiments, the notification module 212, for example, may notify one or more people of various aspects of the meeting, such as decisions made at the meeting affecting their tasks, information about accessing content generated at the meeting, and so on.

Figure 4:
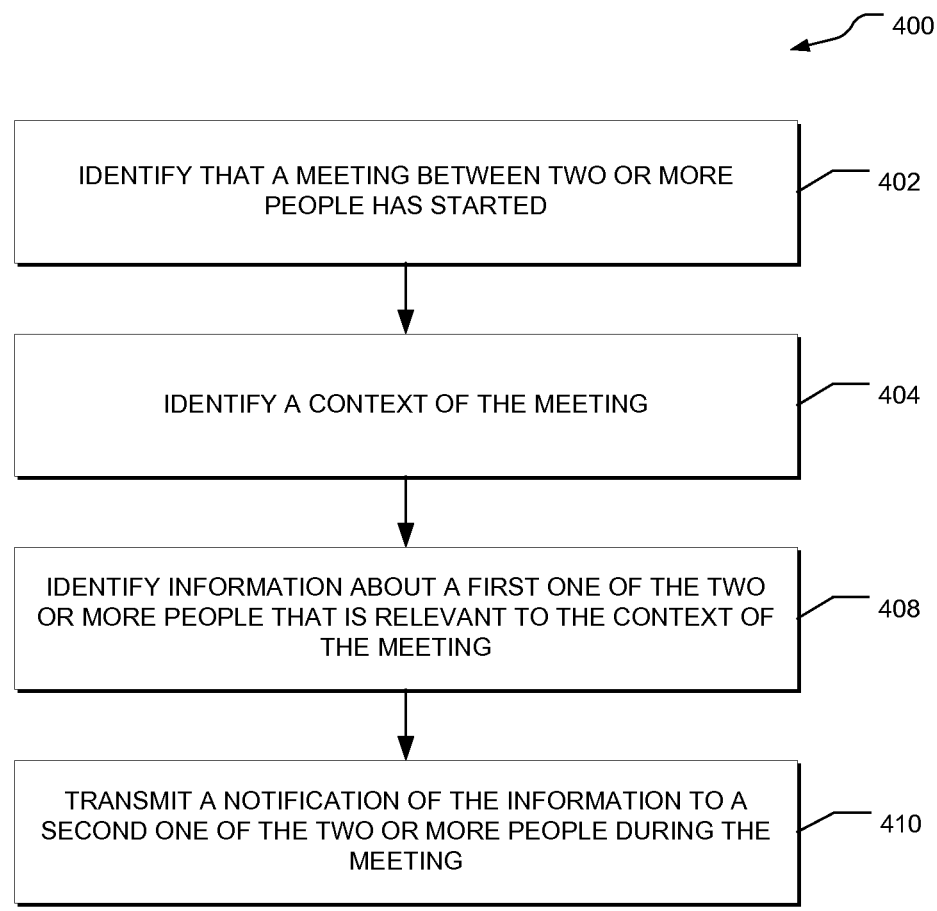
FIG. 4 is a flow chart illustrating example operations of a method 400 of facilitating a meeting based on a context of the meeting and information about the participants of the meeting.

FIG. 4 is a flow chart illustrating example operations of a method 400 of facilitating a meeting based on a context of the meeting and information about the participants of the meeting. In various embodiments, the method 400 is implemented by the modules 202-214 of FIG. 2. At operation 402, the meeting module 202, for example, identifies that a meeting between two or more people has started. For example, the meeting module 202 determines that the two or more people are present at a same geographical location (e.g., based on a communication with the location-based services applications 170). Or the meeting module 202 determines that the meeting has started based on any of the techniques described herein, such as with respect to FIG. 3.

At operation 404, the context module 208, for example, determines a context of the meeting. In various embodiments, the context of the meeting may include the purpose of the meeting (e.g., as set forth in a Microsoft Outlook meeting invitation), a subject of the meeting, a level of the meeting (e.g., executive-, board-, management-, company-, or group-level meeting), an importance of the meeting, a type of the meeting (e.g., status update, presentation, and so on), stakeholders of the meeting, whether the meeting is optional or mandatory for each of the meeting participants, time of the meeting, location of the meeting, invited participants of the meeting, roles of invited participants of the meeting, or any other information pertaining to the context of the meeting.

At operation 408, the information module 204, for example, identifies information about a first one of the two or more people that is relevant to the context of the meeting. For example, the information module 204 may identify that the first one of the two or more people is assigned to a task that is particularly relevant to the subject of the meeting. Or the information module 204 may identify that the first one of the two or more people is managing a group of people who is responsible for implementing a feature that is relevant to the purpose of the meeting. In various embodiments, the information module 204 may access profile data of each participant of the meeting to determine whether information in the profile data is relevant to the context of the meeting. In various embodiments, the profile data may include data managed with respect to a social networking system, such as LinkedIn. The profile data may be explicitly specified by each person or gathered by the social networking system with respect to each person (e.g., based on a monitoring of the behavior of each person with respect to the social networking system). The profile data may be integrated with organizational or project management data associated with the person, such as tasks or roles assigned to the person within an organization. In various embodiments, the information module 204 may sort data that is relevant to the context of the meeting based on its importance to a second participant of the meeting.

At operation 410, the notification module 212 transmits a notification of the information to a second one of the two or more people during the meeting. For example, the notification module 410 notifies the second user of tasks to which the first user is assigned that are relevant to the context of the meeting. Or the notification module 410 notifies the second user of previous projects to which both the first user and the second user have contributed. Or the notification module 410 notifies the second user of relationships between tasks assigned to the first person and tasks assigned to the second person. Thus, the notification module 410 notifies the second user of data that may be particularly relevant to the context of the meeting and the participants of the meeting such that the second user may use the meeting time as efficiently as possible.

Figure 5:
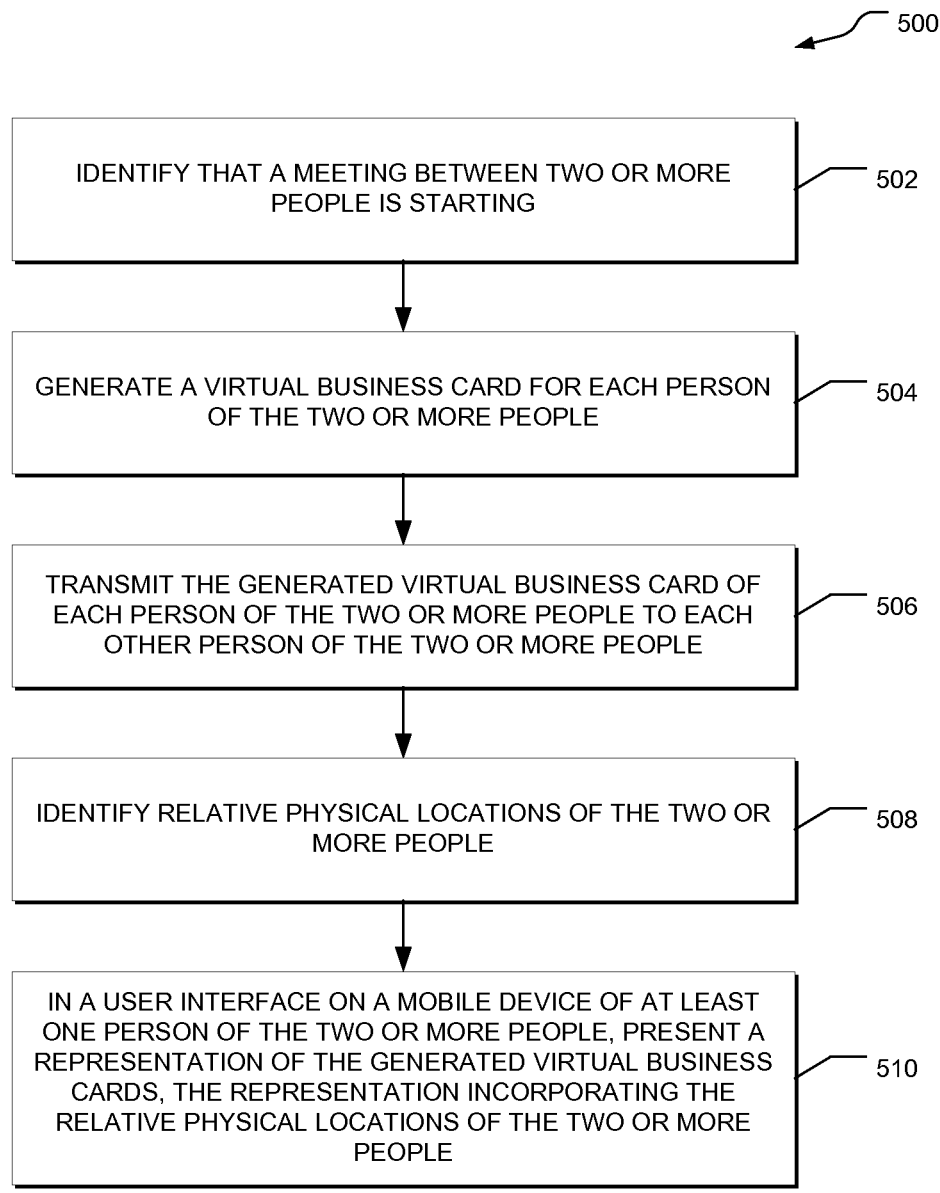
FIG. 5 is a flow chart illustrating example operations of a method 500 of presenting virtual business cards of participants of a meeting in a user interface of a mobile device.

FIG. 5 is a flow chart illustrating example operations of a method 500 of presenting virtual business cards of participants of a meeting in a user interface of a mobile device. In various embodiments, the method 500 is implemented by the modules 202-214 of FIG. 2. At operation 502, the meeting module 202, for example, identifies that a meeting between two or more people is starting. For example, the meeting module 202 determines that the two or more people are present at a same geographical location (e.g., based on a communication with the location-based services applications 170). Or the meeting module 202 determines that the meeting has started based on any of the techniques described herein, such as with respect to FIG. 3.

At operation 504, the information module 204, for example, generates a virtual business card for each person of the two or more people. For example, the information module 204 gathers information about each person (e.g., from a profile of the person maintained with respect to a social networking system, such as LinkedIn). Such information may include names, titles, employment history, work experience, or any other information about the people maintained with respect to the social networking system. The information module 204 then uses the information about each person to generate a virtual business card for the person. A virtual business card for a person may include, for example, the name of the person, the title of the person, one or more phone numbers for the person, an address of the person, a name of the person's company, and so on. The virtual business card may also include a link to more information about the person, such a link to the person's profile on a social networking system.

At operation 506, the notification module 212, for example, transmits the generated virtual business card of each person of the two or more people to each other person of the two or more people.

At operation 508, the location module 206, for example, identifies relative physical locations of the two or more people. For example, the location module 206 may identify the positions of each person of the two or more people seated around a conference table or locations of the two or more people as they are situated within a room in which the meeting is taking place. For people who are attending the meeting remotely, the location module 206 may identify the geographical location of the remote attendees.

At operation 510, the notification module 212, for example, may, in a user interface on a mobile device of at least one person of the two or more people, present a representation of the generated virtual business cards. In various embodiments, the representation may incorporate the relative physical locations of the two or more people. For example, the business cards may be presented within the user interface in relative positions that correspond to the locations of the attendees within a room in which the meeting is being held. In various embodiments, the presentation of the virtual business cards may incorporate formalities, customs, or traditions of a country associated with the owner of the mobile device. For example, for a person associated with France, the virtual business card may include a French translation. As another example, for a person associated with China, the text of the virtual business card may be presented in a gold-colored font.

Figure 6:
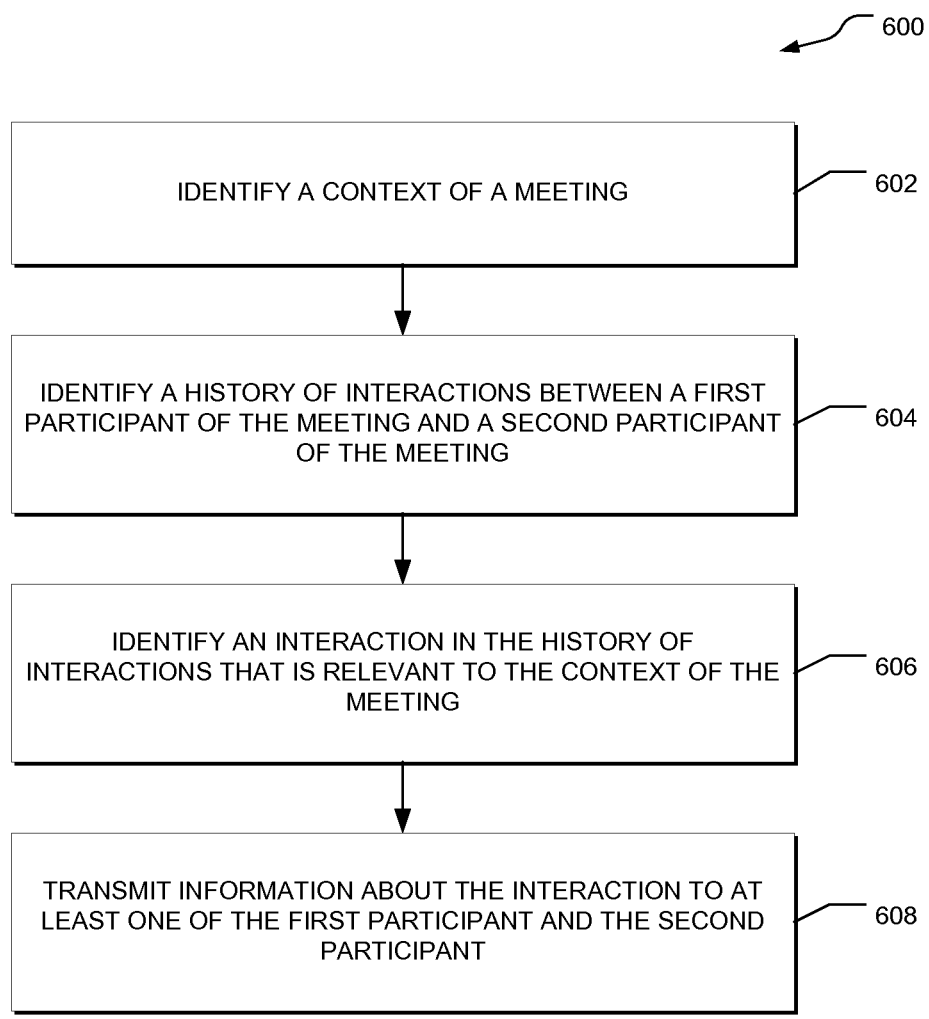
FIG. 6 is a flow chart illustrating example operations of a method 600 of presenting virtual business cards of participants of a meeting in a user interface of a mobile device.

FIG. 6 is a flow chart illustrating example operations of a method 600 of presenting virtual business cards of participants of a meeting in a user interface of a mobile device. In various embodiments, the method 600 is implemented by the modules 202-212 of FIG. 2. At operation 602, the meeting module 202, for example, may identify a context of the meeting. The identification of the context may be performed as described herein, such as with respect to FIG. 4.

At operation 604, the history module 210, for example, may identify a history of interactions between a first participant of the meeting and a second participant of the meeting. For example, the history module 210 may identify that the first participant of the meeting and the second participant of the meeting first met at a previous meeting. Or the history module 210 may identify a history of communications between the first participant and the second participant communicated via a social networking system, such as LinkedIn.

At operation 606, the history module 210 identifies an interaction in the history of interactions that is relevant to the context of the meeting. For example, the history module 210 may identify that the first participant and the second participant discussed an agenda item at a previous meeting that is related to context of the meeting. Or the history module 210 may identify that the first participant and the second participant discussed an agenda item related to the context of the current in other communications, such as communications performed with respect to a social networking system.

At operation 608, the notification module 212, for example, notifies at least one of the first participant and the second participant of the information about the interaction. Thus, the participants of the meeting may be provided timely reminders of previous interactions that they have had with other participants of the meeting that may be relevant to the context of the meeting.

Figure 7:
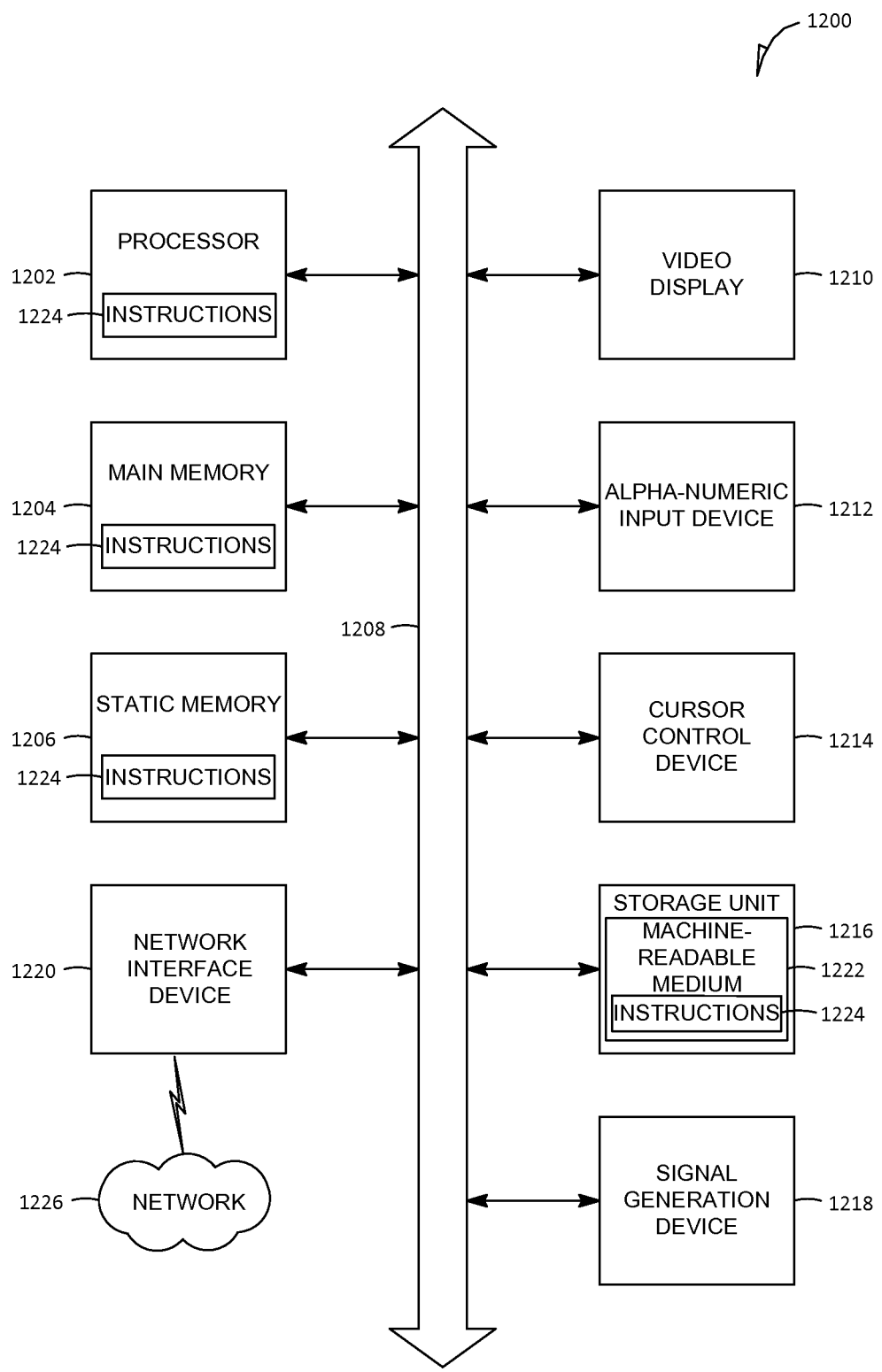
FIG. 7 is a block diagram of a machine in the example form of a computer system within which instructions for causing the machine to perform any one or more of the operations or methodologies discussed herein may be executed.

FIG. 7 is a block diagram of a machine in the example form of a computer system 1200 within which instructions for causing the machine to perform any one or more of the operations or methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation (or cursor control) device 1214 (e.g., a mouse), a storage unit 1216, a signal generation device 1218 (e.g., a speaker) and a network interface device 1220.

The storage unit 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media. The instructions 1224 may also reside, completely or at least partially, within the static memory 1206.

While the machine-readable medium 1222 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

The instructions 1224 may further be transmitted or received over a communications network 1226 using a transmission medium. The network 1226 may be one of the networks 1220. The instructions 1224 may be transmitted using the network interface device 1220 and any one of a number of well-known transfer protocols (e.g., Hyper Text Transfer Protocol (HTTP)). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
identifying, at one or more applications executing on one or more of a plurality of mobile devices associated with a plurality of people, that the plurality of people are starting a meeting, the plurality of people including a plurality of required attendees and a plurality of optional attendees, the plurality of people corresponding to a plurality of virtual business cards, the identifying based on a determination that a number of the plurality of mobile devices associated with the plurality of required attendees has been pointed toward a same predetermined location, the predetermined location corresponding to a definable region in a three-dimensional space in which the meeting is being held, the region being occupied by a person or object that is visually identifiable within the three-dimensional space, the number exceeding a predetermined threshold;
responsive to the identifying that the plurality of people are starting the meeting:
collecting information about the plurality of people that is relevant to a context of the meeting, the information including where at least some of the plurality of people are seated around the conference table and information from the plurality of virtual business cards; and
transmitting at least a portion of the information for presentation on the plurality of the mobile devices, the presentation including an arrangement of representations of the information from the virtual business cards such that the relative positions of the plurality of people at the predetermined location are depicted.

2. The method of claim 1, further comprising generating the plurality of virtual business cards corresponding to the plurality of people based on the information.

3. The method of claim 1, further comprising determining the context of the meeting and selecting the information from a plurality of profiles of the plurality of people maintained with respect to a social networking system based on the context of the meeting.

4. The method of claim 1, further comprising:
identifying a plurality of previous meetings between a first person of the plurality of people and a second person of the plurality of people; and
selecting a previous meeting of the plurality of previous meetings that is relevant to the context of the meeting; wherein the collecting of the information includes gathering data pertaining to the previous meeting.

5. A system comprising:
one or more processors configured to, at least, based on an execution of the one or more instructions contained in a memory:
identify that a plurality of people are starting a meeting, the plurality of people including a plurality of required attendees and a plurality of optional attendees, the plurality of people corresponding to a plurality of virtual business cards, the identifying based on a determination that a number of a plurality of mobile devices associated with the plurality of required attendees has been pointed toward a same predetermined location, the predetermined location corresponding to a definable region in a three-dimensional space in which the meeting is being held, the region being occupied by a person or object that is visually identifiable within the three-dimensional space, the number exceeding a predetermined threshold; and
responsive to the identifying that the plurality of people are starting the meeting, collect information about the plurality of people that is relevant to a context of the meeting, the information including where each of the plurality of people is seated around the conference table and information from the plurality of virtual business cards; and
transmit at least a portion of the information for presentation on the plurality of the mobile devices, the presentation including an arrangement of representations of the information from the virtual business cards such that the relative positions of the plurality of people at the predetermined location are depicted.

6. The system of claim 5, wherein the one or more processors are further configured to, based on an execution of the one or more instructions, generate the plurality of virtual business cards corresponding to the plurality of people based on the information.

7. The system of claim 5, wherein the one or more processors are further configured to, based on an execution of the one or more instructions, determine the context of the meeting and select the information from a plurality of profiles of the plurality of people maintained with respect to a social networking system based on the context of the meeting.

8. The system of claim 5, wherein the one or more processors are further configured to, based on the execution of the one or more instructions:
identify a plurality of previous meetings between a first person of plurality of people and a second. person of the plurality of people; and
select a previous meeting of the plurality of previous meetings that is relevant to the context of the meeting; wherein the collecting of the information includes gathering data pertaining to the previous meeting.

9. A non-transitory machine-readable medium embodying a set of instructions that, when executed by a processor, cause the processor to perform. operations, the operations comprising:
identifying that a plurality of people are starting a meeting, the plurality of people including a plurality of required attendees and a plurality of optional attendees, the plurality of people corresponding to a plurality of virtual business cards, the identifying based on a determination that a number of a plurality of mobile devices associated with the plurality of required attendees has been pointed toward a same predetermined location, the predetermined location corresponding to definable region in a three-dimensional space in which the meeting is being held, the region being occupied by a person or object that is visually identifiable within the three-dimensional space, the number exceeding a predetermined threshold;
responsive to the identifying that the plurality of people are starting the meeting:
collecting information about the plurality of people that is relevant to a context of the meeting, the information including where each of the plurality of people is seated around the conference table and information from the plurality of virtual business cards; and
transmitting at least a portion of the information for presentation on the plurality of the mobile devices, the presentation including an arrangement of representations of the information from the virtual business cards such that the relative positions of the plurality of people at the predetermined location are depicted.

10. The non-transitory machine-readable medium of claim 9, the operations further comprising generating the plurality of virtual business cards corresponding to the plurality of people based on the information.

11. The non-transitory machine-readable medium of claim 9, the operations further comprising determining the context of the meeting and selecting the information from a plurality of profiles of the plurality of people maintained with respect to a social networking system based on the context of the meeting.

12. The non-transitory machine-readable medium of claim 9, the operations further comprising:
    identifying a plurality of previous meetings between a first person of the plurality of people and a second person of the plurality of people; and
    selecting a previous meeting of the plurality of previous meetings that is relevant to the context of the meeting; wherein the collecting of the information includes gathering data pertaining to the previous meeting.

13. The method of claim 1, wherein the definable region in three-dimensional space corresponds to a region occupied by a meeting organizer.

14. The method of claim 1, wherein the definable region in three-dimensional space corresponds to a center of a conference table.

15. The method of claim 1, wherein the information from the plurality of virtual business cards includes at least one of a name, a job title, and a meeting role.

16. The method of claim 1, wherein the information from the plurality of virtual business cards includes pertains to at least one of an employment history or work experience.

* * * * *

UNITED STATES PATENT AND TRADEMARK OFFICE
CERTIFICATE OF CORRECTION

| | |
|---|---|
| PATENT NO. | : 9,661,041 B2 |
| APPLICATION NO. | : 13/931194 |
| DATED | : May 23, 2017 |
| INVENTOR(S) | : Tomer Cohen |

It is certified that error appears in the above-identified patent and that said Letters Patent is hereby corrected as shown below:

In the Claims

In Column 12, Line 33, in Claim 8, delete "second." and insert --second-- therefor In Column 12, Line 41, in Claim 9, delete "perform." and insert --perform-- therefor Signed and Sealed this
Eighteenth Day of June, 2019

Andrei Iancu
*Director of the United States Patent and Trademark Office*